United States Patent [19]

Yamanaka et al.

[11] Patent Number: 4,853,302
[45] Date of Patent: Aug. 1, 1989

[54] BATTERY COMPARTMENT

[75] Inventors: Akira Yamanaka; Keiji Yamazaki, both of Sakai, Japan

[73] Assignee: Minolta Camera Kabushiki Kaisha, Osaka, Japan

[21] Appl. No.: 287,651

[22] Filed: Dec. 21, 1988

Related U.S. Application Data

[63] Continuation of Ser. No. 195,359, May 16, 1988, abandoned, which is a continuation of Ser. No. 920,288, Oct. 17, 1986, abandoned.

[30] Foreign Application Priority Data

Oct. 21, 1985 [JP] Japan ............................ 60-161575[U]

[51] Int. Cl.$^4$ .............................................. H01M 2/10
[52] U.S. Cl. ........................................ 429/99; 429/9; 429/100; 439/500
[58] Field of Search ................... 429/96, 97, 99, 100, 429/9; 439/500

[56] References Cited

U.S. PATENT DOCUMENTS

| 998,895 | 7/1911 | Harvey | 429/97 X |
|---|---|---|---|
| 1,499,279 | 6/1924 | Wootton | 429/97 |
| 4,431,717 | 2/1984 | Kikuchi | 429/100 |

FOREIGN PATENT DOCUMENTS 2805067  8/1979  Fed. Rep. of Germany ........ 429/99

Primary Examiner—Stephen J. Kalafut
Attorney, Agent, or Firm—Burns, Doane, Swecker & Mathis

[57] ABSTRACT

The present invention relates to a battery compartment capable of selectively accommodating an integrated battery unit and a plurality of cylindrical batteries. This battery compartment comprises a housing adapted to fit the integrated battery unit and a support member which is pivotably placed about a support portion provided to a side interior wall of the housing between a supporting position substantially perpendicular to the side interior wall to laterally support the plurality of cylindrical batteries and a recessed position along the side interior wall to be recessed from an accommodating space for the integrated battery unit. This support member is always urged toward the supporting position and a loading of the integrated battery unit is carried out in such a manner that the support member is displaced to the recessed position against a resilience of the support member toward the supporting position.

11 Claims, 7 Drawing Sheets

BATTERY COMPARTMENT

This application is a continuation of application Ser. No. 195,359, filed May 16, 1988, which is a continuation of Ser. No. 920,288, filed Oct. 17, 1986, both now abandoned.

BACKGROUND OF THE INVENTION

1. Field of the Invention

The present invention relates to a battery compartment for selectively accommodating an integrated battery unit integratedly including a plurality of batteries in a package and a plurality of cylindrical batteries such as AAA type batteries, and more particularly to a battery compartment employed in varied electronic devices such as a photographic camera, an exchangeable flash device, a radio, a tape recorder and the like.

2. Description of the Prior Art

This type of battery compartment for selectively accommodating the integrated battery unit and the plurality of cylindrical batteries is disclosed, for example, in a U.S. patent application published under U.S. Pat. No. 4,468,439. This prior-art compartment is constructed on the assumption that the integrated battery unit and the plurality of cylindrical batteries as a whole have substantially the same volume and periphery and such that when the cylindrical batteries are mounted therein a partition member for separating the cylindrical batteries is projected into the battery compartment.

According to the above-described construction, however, when an overall periphery of the cylindrical batteries is smaller, especially in a cross section thereof, than a periphery of the integrated battery unit, there occur such inconveniences that the cylindrical batteries unnecessarily move or lean inside the compartment thereby to cause an insufficient or erroneous electrical contact and that a first inserted battery leans to obstruct an insertion of a second battery. Further, it is to be noted that the cylindrical batteries such as the AAA type batteries often have relatively large peripheral size tolerance which also often causes the above unnecessary movement and leaning of the batteries.

SUMMARY OF THE INVENTION

Therefore, it is the object of the present invention to provide a battery compartment capable of selectively accommodating the integrated battery unit and a plurality of cylindrical batteries having different peripheral sizes while preventing the unnecessary movement and the leaning of the batteries.

In order to achieve the above-described object, the battery compartment according to the present invention comprises a housing capable of selectively accommodating first battery means being an integrated battery unit and second battery means including a plurality of cylindrical batteries arranged to be parallel to one another and to have a total occupying area in cross sectional direction smaller than that of the first battery means, and formed to fit the integrated battery unit and a support member pivotable relative to an interior wall of the housing between a supporting position substantially perpendicularly raised from the interior wall to support the loaded second battery means and a recessed position recessed from an accommodating space for the first battery means to be substantially along the interior wall, the support member being resilient toward the supporting position.

With this construction, when the cylindrical batteries are inserted into the housing, the support member remains at the supporting position to guide the insertion of the batteries and at the same time to support the batteries at a desired position. On the other hand, when the integrated battery unit is inserted into the housing, the support member is pressed by an leading edge of the battery unit to be recessed into the recessed position thereby to permit a smooth and snug insertion of the integrated battery unit into the housing.

Further, even if the cylindrical batteries have a larger total cross sectional area than usual within the range of the aforementioned tolerance, such cylindrical batteries are also smoothly and snugly accommodated into the housing since the support member is slightly displaced against its resilience.

Other and further objects, features and advantages of the invention will appear more fully from the following description.

BRIEF DESCRIPTION OF THE DRAWINGS

The accompanying drawings illustrate a battery compartment related to the present invention, in which.

DESCRIPTION OF THE PREFERRED EMBODIMENTS

Figure 1:
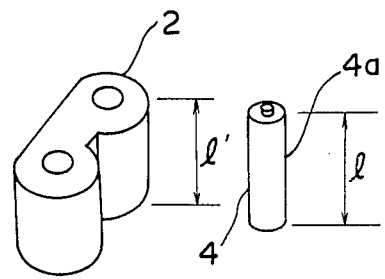
FIG. 1 is a perspective view of an integrated battery unit and a cylindrical battery to be accommodated in the battery compartment of the present invention.
Figure 2:
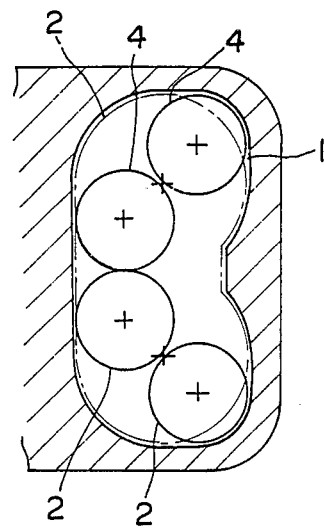
FIG. 2 is a partially sectional view showing the relationship between a cross section of the battery compartment of the first embodiment of the present invention and the cylindrical batteries or the battery unit.

FIG. 1 shows an integrated lithium battery unit 2 and a cylindrical AAA type battery 4 to be loaded in a battery compartment according to the present invention. The integrated battery unit 2 comprises two lithium batteries serially connected with each other in a package and provides a power output of 6 V. Thus, in order to obtain substantially the same amount of power output, four cylindrical AAA type batteries 4 each providing 1.5 V must be serially connected with one another. The integrated battery unit 2 includes positive and negative terminals on an edge face thereof and is shorter in length and at the same time, as shown in FIG. 2, is larger in cross section area than the AAA type battery. Therefore, if a housing 1 has its cross section formed so as to substantially correspond to the cross section of the integrated battery unit 2, the four AAA type batteries are arranged in the same space with cross sections thereof forming an arcuate line as a whole, as shown in FIG. 2.

FIGS. 3 through 7 show an embodiment of the battery compartment including the integrated battery unit 2 and the four cylindrical batteries 4 in the manners shown in FIG. 2. In this embodiment, the battery compartment is adapted to be employed in a photographic camera. The housing 1 comprises a support plate 6 for supporting the loaded cylindrical batteries. This support plate 6 has a form corresponding to the cross section of space created in the housing when the cylindrical batteries 4 are loaded therein and defines four concave portions 6a respectively facing each of side walls 4a of the cylindrical batteries 4. The support plate 6 is provided with a hinge portion 6b, whereby the support plate 6 is supported to be pivotable between a position (shown by a continuous line FIG. 4) raised from an interior wall 1a of the housing and a recessed position (shown by a broken line in FIG. 4) substantially along or on the same plane as the interior wall 1a and is urged by means of a spring 8 toward the raised position.

Figure 5:
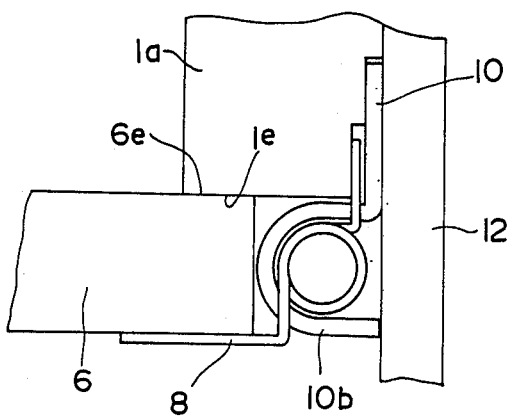
FIG. 5 is a partially sectional view showing a hinge portion of the battery compartment of the first embodiment.
Figure 6:
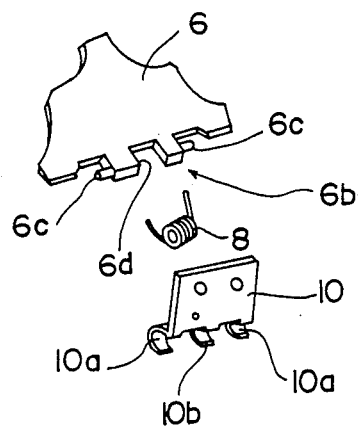
FIG. 6 is a partially exploded perspective view of the hinge portion.

FIGS. 5 and 6 show in greater detail the construction of the hinge portion 6b of the support plate 6. This hinge portion 6b includes two hinge pins 6c and a cut-out portion 6d. A hinge support plate 10 includes a hinge pin suport portion 10a for pivotably supporting the hinge pin 6c and a spring support portion 10b for supporting the spring 8 and is fixed to a strap member 12 of the camera integratedly fixed or connected to the interior wall 1a. Referring to FIG. 5, the support plate 6 has its raised position defined as an upper face 6e thereof comes into an urged contact with an edge face 1e of the interior wall 1a, whereas the plate 6 forms, at the recessed position, a wall face substantially along the interior wall 1a of the housing as recessed into a concave portion 1b of the interior wall 1a.

Figure 3:
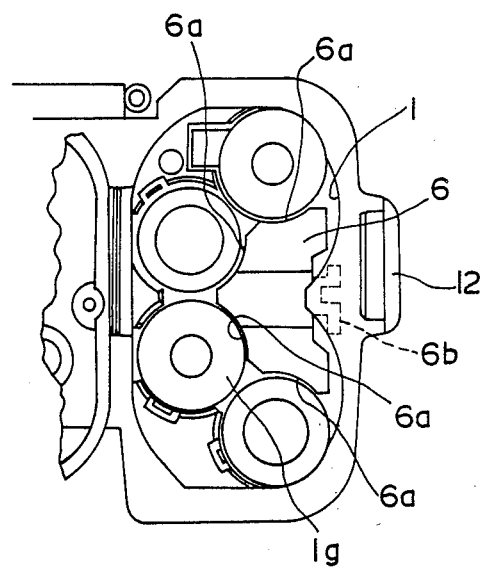
FIG. 3 is a cross sectional view showing the battery compartment of the first embodiment.
Figure 4:
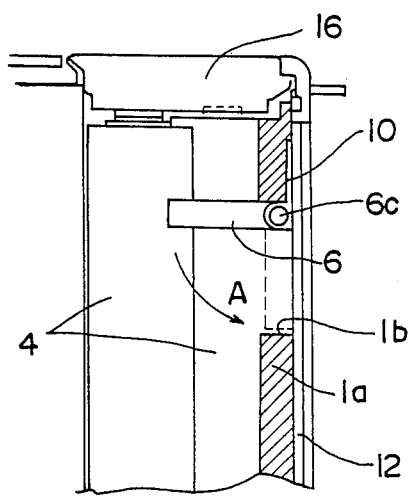
FIG. 4 is a vertically sectional view of the battery compartment of the first embodiment.
Figure 7:
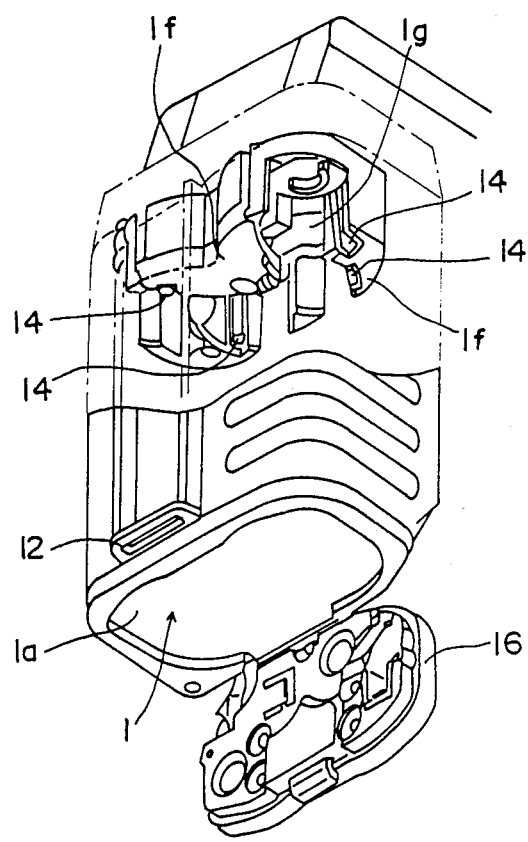
FIG. 7 is a partially cut-out perspective view showing the battery compartment of the first embodiment.

Referring to FIGS. 3 and 7, the housing 1 defines a receiver wall 1f receiving in contact with the integrated battery unit 2 and a concave portion 1g recessed farther than the receiver wall 1f and formed substantially along an exterior face of the arranged cylindrical batteries so as to receive the cylindrical batteries 4. Inside the concave portion 1g, there is provided an urging member 14 for elastically and laterally urging the loaded cylindrical batteries. Contact members coming into contact with the positive and negative terminals of the integrated battery unit 2 are attached to the receiver wall 1f. And contact members coming into contact with the positive and negative terminals of the four cylindrical batteries and serially connecting the same with one another are attached into the concave portion 1g and to a housing cover 16. It is to be noted here that the contact members for the integrated battery unit 2 are placed under the support plate 6 at its raised position. More particularly, the contact members for the integrated battery unit 2 are attached to the receiver wall 1f as to be located within a projection area of the support plate 6 at its raised position in the direction of the insertion of the battery unit 2. With the above-described construction, when the cylindrical batteries are loaded, the support plate 6 serves to prevent the contact members for the integrated battery unit from coming into contact with the entering cylindrical batteries. Also, when the cylindrical batteries are loaded, the same are supported by the support plate 6 and the concave portion 1g including the urging member 14 as the support plate 6 is urged by means of the spring 8 to be placed at the raised position. On the other hand, when the integrated battery unit 2 is loaded, the support plate 6 is pressed by a leading edge face of the battery unit 2 to be pivoted into the recessed position against the urging force of the spring 8.

Figure 8:
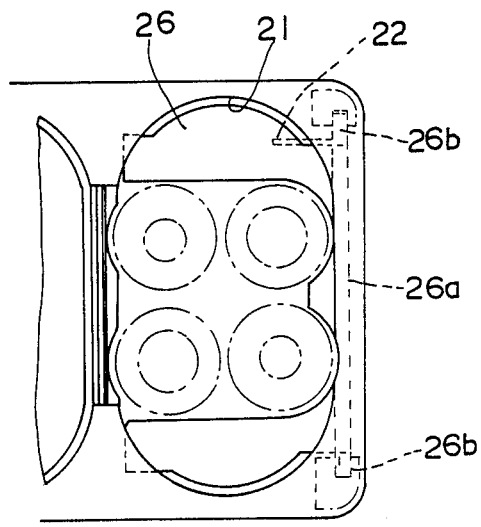
FIG. 8 is a cross sectional view showing a battery compartment of the second embodiment of the present invention.
Figure 9:
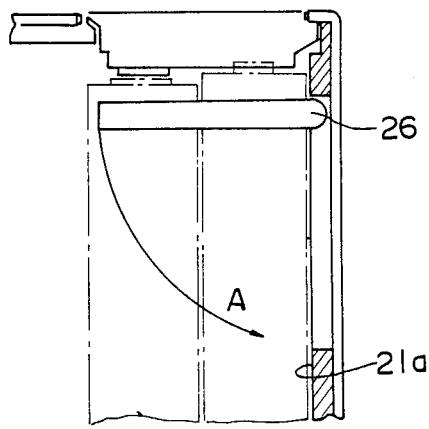
FIG. 9 is a vertically sectional view showing the battery compartment of the second embodiment.

FIGS. 8 and 9 show a modified embodiment of the above-described embodiment. In this embodiment, the battery compartment is adapted to be employed in an electronic flash device. This modified battery compartment is adapted to hold the four cylindrical batteries in a central section of the space accommodating the integrated batery unit. A support plate 26 as a whole is 'U' shaped as shown in FIG. 8 and has its external periphery substantially corresponding to a cross section of space created inside a housing compartment when the cylindrical batteries are inserted thereinto. This support plate 26 is supported by means of a hinge portion 26a to be pivotable between a position raised from an interior wall 21a of the housing 21 and a recessed position substantially along the interior wall 21a and is urged by a spring 22 toward the raised position with a corner 26b thereof engaged with a step portion defined in the interior wall 21a.

Figure 10A:
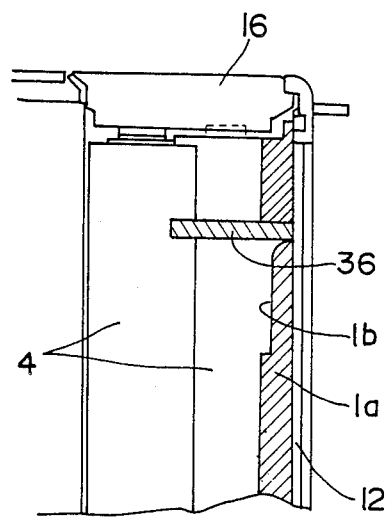
FIG. 10A is a vertically sectional view showing the relationship between a support member of a modified embodiment of the present invention and the cylindrical batteries.
Figure 10B:
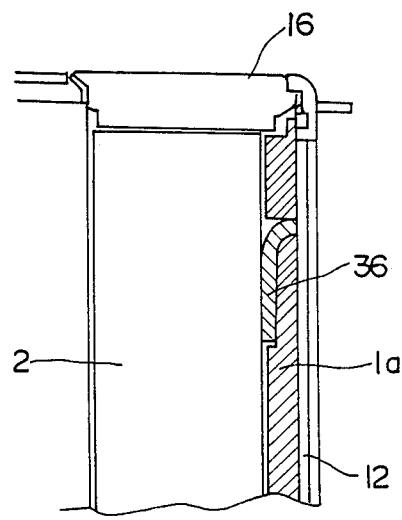
FIG. 10B is a vertically sectional view showing the relationship between the support member of the modified embodiment of the present invention and the integrated battery unit.

FIGS. 10A and 10B show a modified embodiment of the support plate in which a support plate 36 is formed of an elastic material such as rubber and the like and has an end thereof directly fixed to an interior wall 1a or a metal member 12 by insertion or adhesion. As shown in FIG. 10B, when the integrated battery unit 2 is loaded, the support plate 36 is bent along the side face of the interior wall 1a and, as shown in FIG. 10A, returns to the supporting position for supporting the cylindrical batteries 4 by the elasticity thereof.

With respect to another modified embodiment, the support plate may be replaced by a transformable block member such as a sponge, such that transformability thereof is utilized to provide the supporting state and the recessed state.

The support plates of the above-described embodiments, as formed to prevent free space created between the loaded cylindrical batteries and the interior wall of the housing, permit a user to readily know where to insert the cylindrical batteries.

Figure 11:
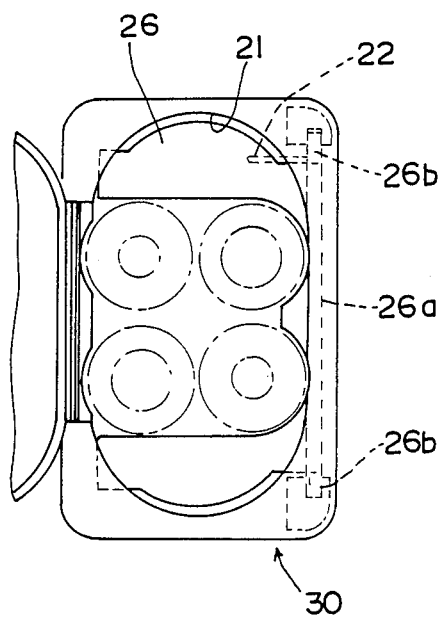
FIG. 11 is a plan view showing another embodiment of the present invention.

In the descriptions of the aforementioned embodiments, it is assumed that the battery compartment is integratedly mounted in the photographic camera and in the electronic flash device. However, the application of this battery compartment is not limited to the photographic camera or to the electronic flash device, but may be made for other electronic devices such as a radio, a tape recorder and the like. Further, as shown in FIG. 11, the battery compartment of the present invention may be formed as a battery case or a battery holder 30 provided independently of the electronic device. In this case, the battery compartment may be either freely attachable to and detachable from the electronic device, or may be used entirely independently of the device. Therefore, this battery compartment comprises terminals or wire(s) for connecting the same to the electronic device.

We claim:

1. A battery compartment capable of selectively accommodating first battery means and second battery means having different shapes from each other, comprising:
   a housing formed to fit said first battery means, and
   a support member pivotably placed about a support section attached to a side interior wall of said housing between a supporting position wherein said support member is projected along a plane substantially perpendicular to said side interior wall to laterally support said second battery means as accommodated in said housing and a recessed position along said side interior wall to be recessed from an accommodating space for said first battery means, wherein an edge of said support member is rotated to a position away from said side wall of said housing when said support member is placed at the supporting position, said support member being urged toward the supporting position,
   wherein said first battery means is an integrated battery unit and said second battery means includes a plurality of cylindrical batteries which are arranged such that total occupying area in a cross section thereof is smaller than a cross section of said first battery means.

2. A battery compartment, as defined in claim 1, wherein said support member is formed at least partially of an elastic material such that said support member is displaced to the recessed position through an elastic transformation and returns to the supporting position through an elastic resilience.

3. A battery cmpartment, as defined in claim 1, wherein said support member includes urging means for urging said support member toward the supporting position.

4. A battery compartment, as defined in claim 3, wherein said integrated battery unit is shorter in height than said cylindrical batteries and a base portion of said housing includes a receiver portion for said integrated battery unit and defines in said receiver portion a concave portion for receiving an edge of each of said cylindrical batteries whereby said cylindrical batteries are supported by said support member and said concave portion.

5. A battery compartment, as defined in claim 4, wherein said integrated battery unit includes both positive and negative terminals in an end face thereof facing said receiver portion included in said base portion of said housing and contact members for said integrated battery unit are placed within a projection region in said base portion of said support member at the supporting position in the direction of an insertion of said integrated battery unit, whereby said support member is displaced to the recessed position when said integrated battery unit is loaded.

6. A battery compartment, as defined in claim 5, wherein said battery compartment is integratedly mounted in a photographic camera.

7. A battery compartment, as defined in claim 5, wherein said battery compartment is formed as an independent battery case.

8. A battery compartment, as defined in claim 1, wherein the number of plurality of said cylindrical batteries included in said second battery means is determined such that said plurality of cylindrical batteries togetherwith provide substantially the same amount of voltage as said integrated battery unit.

9. A battery compartment capable of selectively accommodating an integrated battery unit as a first battery means and a plurality of cylindrical batteries as a second battery means which are arranged such that the total occupying area in a cross section thereof is smaller than a cross section of said first battery means and the length thereof is longer than that of said first battery means, comprising:
   a housing including a first accommodating section formed to fit said first battery means and a second accommodating section defined in a base portion of said accommodating section for accommodating and supporting a portion of said second battery means longitudinally exceeding said first battery means, and
   a support member pivotably placed about a support section attached to a side interior wall of said housing between a supporting position substantially perpendicular to said side interior wall to laterally support said second battery means as accommodated in said housing and a recessed position along said side interior wall to be recessed from an accommodating space for said first battery means, said support member having a profile corresponding to a profile of said second battery means and resilience toward the supporting position,
   wherein when said first battery means is inserted said support member is recessed from the supporting position into the recessed position thereby permitting accommodation of said first battery means and when said second battery means is inserted said support member in cooperation with said second accommodating section maintains the position of said second battery means in said housing.

10. A battery compartment capable of selectively accommodating an integrated battery unit as a first battery means and a plurality of cylindrical batteries as a second battery means which are arranged such that the total occupying area in a cross section thereof is smaller than a cross section of said first battery means and the length thereof is longer than that of said first battery means, comprising;
   a housing including a first accommodating section formed to fit said first battery means and a second accommodating section defined in a base portion of said first accommodating section for accommodating and supporting a portion of said second battery means longitudinally exceeding said first battery means; and
   a support member pivotably placed between a supporting position to laterally support said second battery means as accommodated in said housing and a recessed position to be recessed from the supporting position so as to enable insertion of said first battery means;
   wherein when said first battery means is inserted said support member is recessed from the supporting position into the recessed position thereby permitting accommodation of said first battery means and when said second battery means is inserted said support member in cooperation with said second accommodating section maintains the position of said second battery means in said housing.

11. A battery compartment, as claimed in claim 10, wherein said support member has a profile corresponding to a profile of said second battery means.

* * * * *